United States Patent
Kurgan et al.

[11] Patent Number: 6,032,969
[45] Date of Patent: Mar. 7, 2000

[54] ARM OR LEG ACTUATED EXERCISE APPARATUS

[76] Inventors: David Kurgan; Alexander Kurgan, both of 3352 4th St., Oceanside, N.Y. 11572

[21] Appl. No.: 08/968,540

[22] Filed: Nov. 12, 1997

Related U.S. Application Data

[60] Provisional application No. 60/031,429, Nov. 21, 1996.

[51] Int. Cl.[7] ........................................... B62M 1/00
[52] U.S. Cl. ............................... 280/233; 280/230
[58] Field of Search ................................. 280/233, 234, 280/235, 230, 238, 242.1, 249, 250

[56] References Cited

U.S. PATENT DOCUMENTS

| | | | |
|---|---|---|---|
| 2,884,259 | 4/1959 | Snodgrass | 280/234 |
| 3,760,905 | 9/1973 | Dower | 185/2 |
| 4,270,766 | 6/1981 | Thomas | 280/234 |
| 4,639,007 | 1/1987 | Lawrence | 280/234 |
| 4,858,942 | 8/1989 | Rodriguez | 280/233 |
| 5,082,302 | 1/1992 | Nacar | 280/234 |
| 5,431,614 | 7/1995 | Jeranson | 482/57 |
| 5,690,346 | 11/1997 | Keskitalo | 280/234 |
| 5,816,598 | 10/1998 | Dodakian | 280/234 |

*Primary Examiner*—Lanna Mai
*Assistant Examiner*—Kevin McKinley

[57] ABSTRACT

An exercise apparatus with a transmission which may be selectively adjusted to provide either arm exercises, leg pedaling exercises or stepping exercises, said apparatus formed with a frame; a seat on said frame; a pair of rear drive wheels rotatably mounted on a rear shaft at the rear of said frame; with the transmission having three parts; a first transmission stage mounted on said fame coupled to transmit power to said rear drive wheels by means of a sprocket chain transmitting force between a sprocket on a freewheel supporting axle and a sprocket on the rear shaft. A second transmission stage is formed by a sprocket on a crankshaft supported on a bracket swingable on said freewheel supporting axle with a sprocket chain extending from a sprocket on the crankshaft to the sprocket wheel on the freewheel axle. A third transmission stage is formed by a spring and sprocket chain trained over the freewheel sprocket, with the free ends of the spring and chain anchored to a swinging pedal.

5 Claims, 4 Drawing Sheets

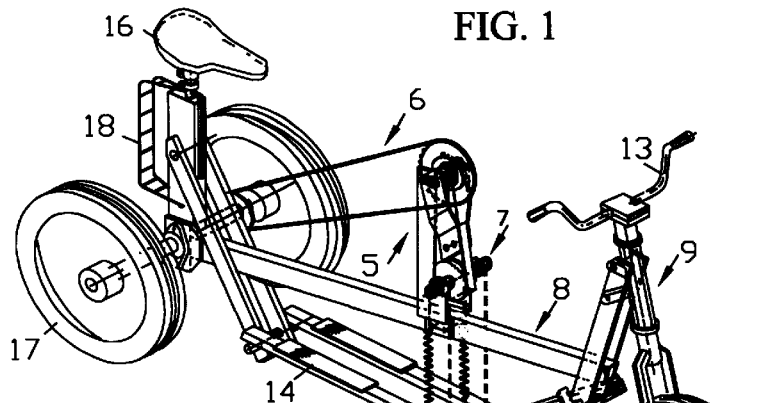
FIG. 1
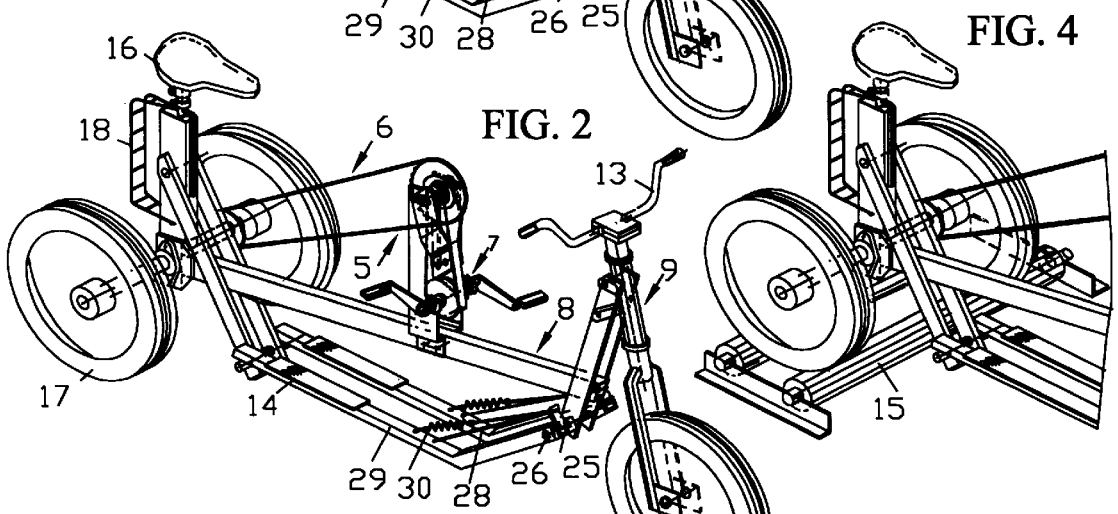
FIG. 2
FIG. 4
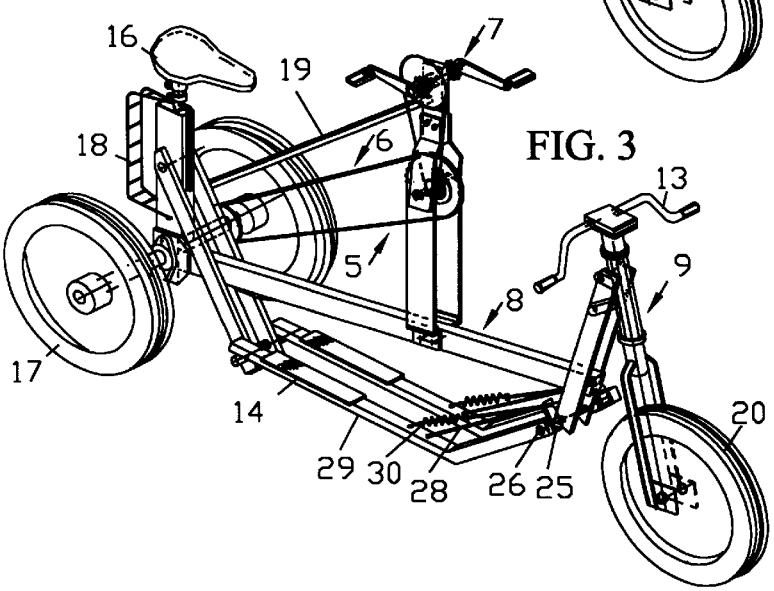
FIG. 3
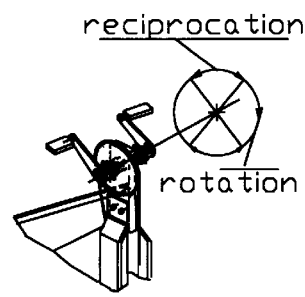
FIG. 3A

ARM OR LEG ACTUATED EXERCISE APPARATUS

This Appln claims the benefit of U.S. Provisional No. 60/031,429 filed Nov. 21, 1996.

BACKGROUND OF THE INVENTION

In the automobile and computer era physical activity for the population has significantly decreased.

Today, in industrial countries bicycles are used more for exercise than for transportation.

There are currently many different kinds of bicycles and exercise equipment available on the market. However, all this equipment possesses certain limitations and is not capable of providing a total body workout while providing transportation.

Bicycles are usually powered by the legs and feet and therefore provide no workout for the upper body. Some bicycles are arm and hand powered, but they do not provide any exercise for legs.

There are stationary exercise bicycles, such as shown by U.S. Pat. No. 4,917,376 and which provide a workout for arms and leg, but they cannot be used for transportation. There are also hand and foot powered bicycles such as U.S. Pat. Nos. 5,431,614 and 5,511,810 but they are not capable of providing multi-function operation.

To solve this problem, this invention combines three different methods of applying human power: stepping or running in place where the is standing or sitting and his feet are pressing swinging pedals, regular cycling, and hand rotation or reciprocating. Diversified exercises are achieved by installation of three stage transmission. Second stage pivots around a freewheel axle and has a special crankshaft with three sprockets. Compact size of the folded vehicle together with compact roller stand, permits for transportation in middle size car trunk and to be used for outdoor exercise.

BRIEF DESCRIPTION OF THE DRAWINGS

Other features and advantages of this invention will become apparent in the following detailed description of the preferred embodiment of the invention, with reference to the accompanying drawings in which the vehicle is set up for three different applications:

FIG. 1 is a perspective view of vehicle which is set up for foot powered stepping exercise with the secondary stage of transmission rotated down and engaged with chains and swinging levers to the third transmission stage.

FIG. 2 is a perspective view of the vehicle which is set up for regular operation cycle, with the secondary stage of transmission rotated down; the third stage of transmission stage disconnected with its drive chain hung on brackets and rotary pedals attached to the crankshift.

FIG. 3 is a perspective view of the apparatus set up to exercise the arms with the secondary transmission stage turned up to permit circular rotation with pedal in diagonal position, circular rotation with pedal in parallel position, reciprocating operation for each arm (imitating rowing exercise).

FIG. 4 is a perspective view of vehicle, which is set up as in FIGS. 1, 2, 3, with vehicle is installed on the top of a roll stand used for stationary exercise in home or outside.

DESCRIPTION OF THE PREFERRED EMBODIMENT

Figure 6:
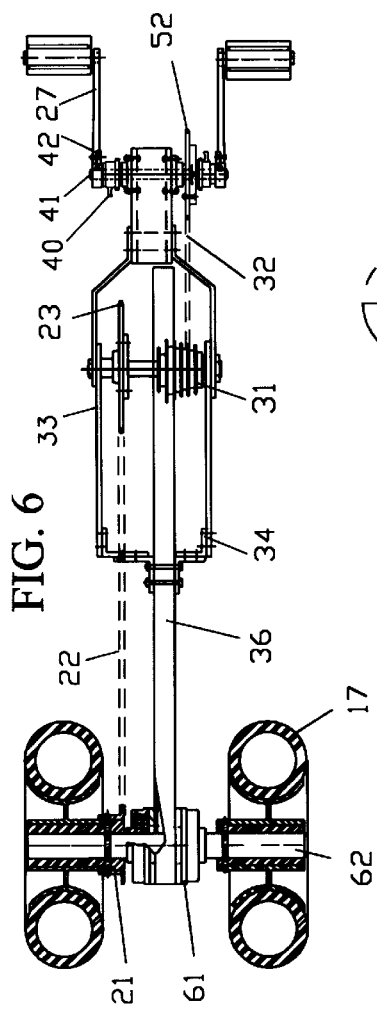
FIG. 6 is a top view of transmission.

Referring to FIG. 1, a perspective view of movable and stationary exercise vehicle includes frame 8, front steering assembly 9, rear assembly 10, handlebar 13, foot support plates 14, saddle 16, rear wheels 17, luggage compartment 18, and conventional brake which is mounted on the conventional front steering assembly is not indicated in this drawing. Transmission 5, in which the secondary stage with crankshaft assembly 7 is turned down around freewheel axle, and the third stage of transmission is engaged by raised chains 28 from brackets 25 via crankshaft sprockets and is set-up for foot operation (similar to aerobic stepper exercise). The swinging movement down from foot forces the swing lever 29 to pivot around axle 26 forcing chain 28 against spring 30 and rotates crankshaft sprockets with inner one way clutch 43 in the clockwise direction and engaging transmission 5 rotates drive wheel 17. Swing levers are returned to the initial upper position by springs 30.

Referring to FIG. 2, a perspective view of the vehicle in which the secondary stage of transmission with crankshaft 7 is turned down, fixed to the frame, and the third stage of transmission is disconnected two loops from chains 28 and springs 30 are suspended on brackets 25, and the two pedal arms are attached to the crankshaft, (swinging pedals not usable). All other items indicated on FIG. 1 are the same.

Referring to FIG. 3, a perspective view of vehicle in which the secondary stage of transmission with crankshaft assembly 7 is pivoted up around the freewheel axle, and fixed by link 19. The pedals are then attached to crankshaft in diagonal or parallel position or to sprockets on overrun clutch. Third stage of transmission is disengaged and chains 28 with springs 30 are suspended on brackets 25. All other items indicated in FIG. 1 are the same.

Referring next to FIG. 4, a view is seen of the vehicle set up as in FIGS. 1,2,3 and installed on top of a two roller stand for indoor and outdoor stationary exercise. For imitating road conditions, one roll has the outside tube installed on eccentric bushings.

Figure 5:
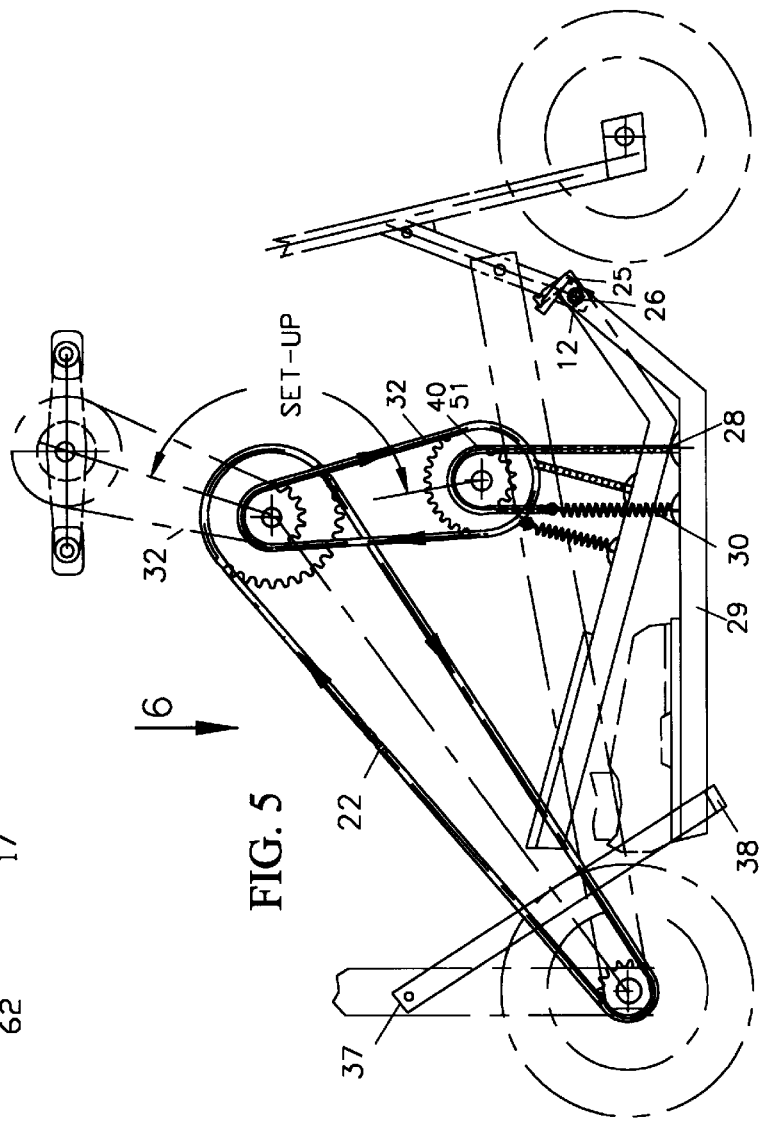
FIG. 5 is a side view of transmission.

Refer next to FIG. 5, side view, and FIG. 6, top view, of transmission composed of three stages.

First stationary stage has endless chain 22, which transfers power from sprocket 23 attached to freewheel 31 to sprocket 21 sleeved rigidly on the drive shaft 62 rotatable in two pillow bearing blocks 61 and drives the rear wheels 17.

Secondary stage of transmission has endless chain 32 which transmits power from sprocket 52 fixed on the crankshaft 42 to the freewheel 31. Right side of this stage terminated by crankshaft FIG.7, and pivoted around freewheel axle, can be pivoted down for foot rotation as shown in FIGS. 1, 2 or raised and fixed by link 19 for hand rotation as shown in FIG. 3.

The third transmission stage is used for a stepping exercise. When secondary stage for stepping operation is set up in the low position, and the crank pedals 27 are disconnected from the crankshaft, chains 28 and springs 30 on both sides are moved from brackets 25 to crankshaft assembly. Each swing pedal moving down around axle 26 transfer through chain 28 via sprockets 40 and 51 with overrun clutches torque to crank shaft 42, extension spring 30 extends and for next cycle lifts swing pedal 29 up; clutches in sprocket 40 and 51 do not engage in this action (idle stroke). For rotation cycle (see FIGS. 2, 3) chains 28 are removed from sprockets 40, 51 and hang up on brackets 25 in front portion of swing pedals.

Figure 7:
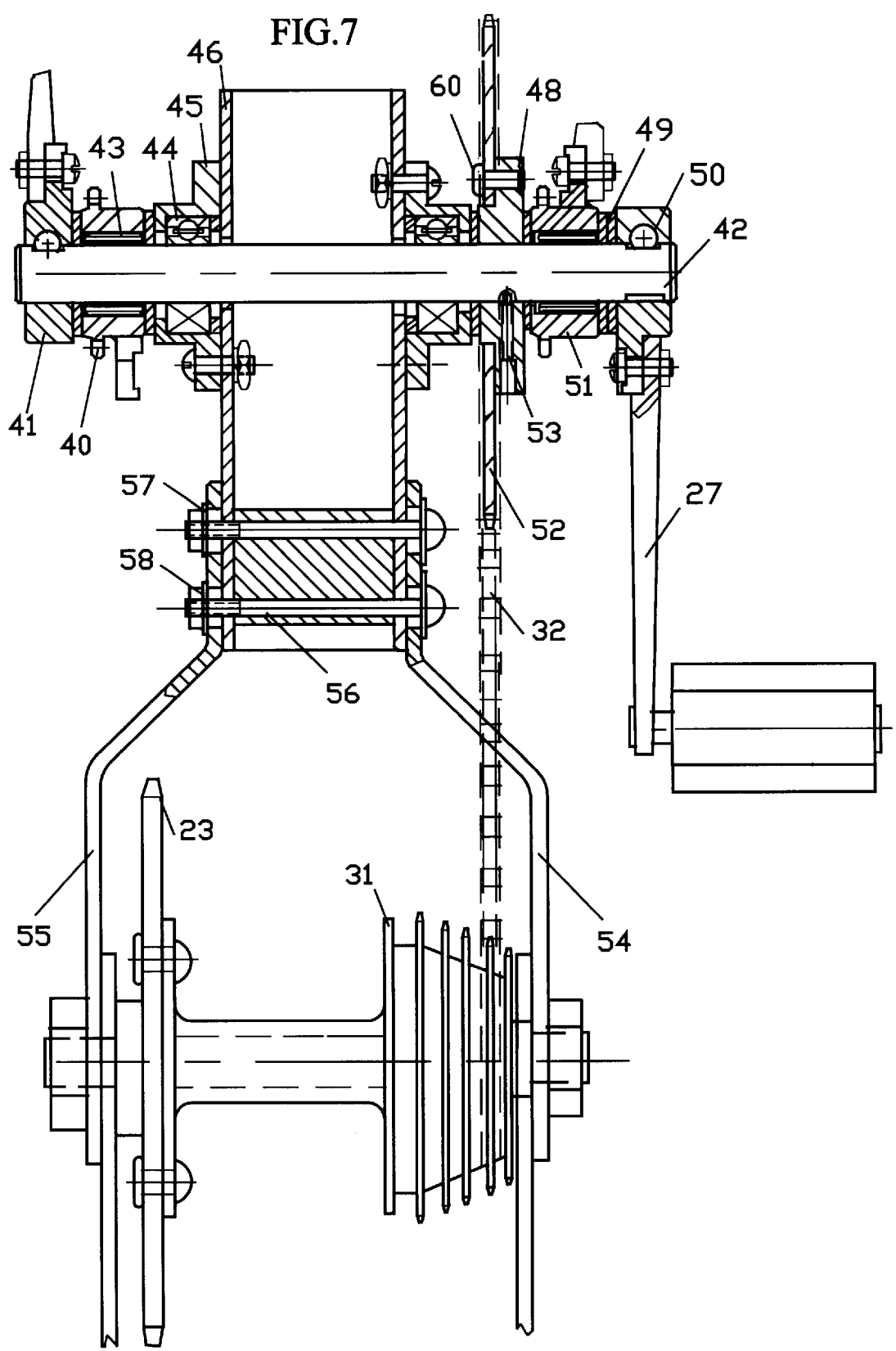
FIG. 7 is a section view of crankshaft (secondary transmission stage).

Refer to FIG. 7, crank shaft 42 is rotated in two radial bearings 44 which are installed in the flange housings 45 and attached to square tubing 46. Crank shaft unit supported by bracket includes tubing 46 and levers 54, 55 and can be pivoted up and down around the freewheel axle 31. Chain tension is adjusted with two levers 54, 55 which are fixed by screws 56 and nuts 58.

On the each side of crank shaft are installed sprockets 40 and 51 with pressed in overrun clutches 43 for locking crank shaft when it is rotated in predetermined direction and allowing it to rotate freely in the opposite direction. On the right side of the shalt 42, between housing and sprocket with overrun clutch, mounted on the hub 48 and fastened by rivets 60 the secondary stage transmission sprocket 52 and fixed to shaft 42 by set screw 53. Between flange housing 45, sprockets 40, 51 and pedal arm flange are disposed antifriction washers 49 which seal and separated rotation parts. On both sides of the crank shaft, attached by tapered pin 50 are the pedal arm heads 41 ended by short levers with screw for rapid connection of pedal arm. A similar lever is welded to sprocket 51 for attaching pedal arm in hand powered application (rowing, reciprocating). In this case torque moment from left hand is going through tapering pin directly to shaft 42, and from right arm through sprocket 51 to overdrive clutch 43 and to crank shaft 42. For hand powered cycling operation FIG. 3 pedal right and left arm head are fixed to shaft 42 which has on the left side two flat slotted surfaces for tapered pin 50 is allows rotary pedals to be installed in parallel or in diagonal position.

The crankshift rotation permits diagonal pedal rotation, parallel and series rowing motion.

Figure 8A:
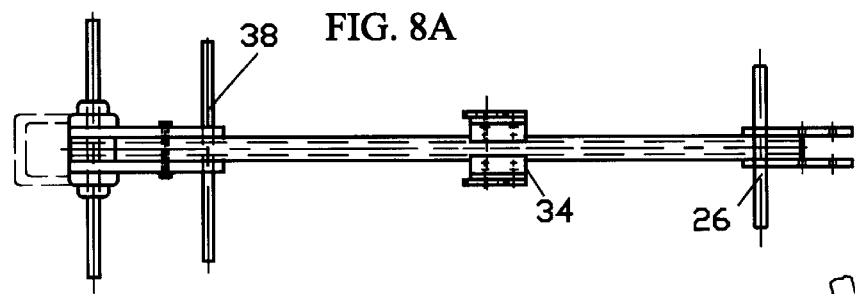
FIG. 8a is a top view of frame.
Figure 8:
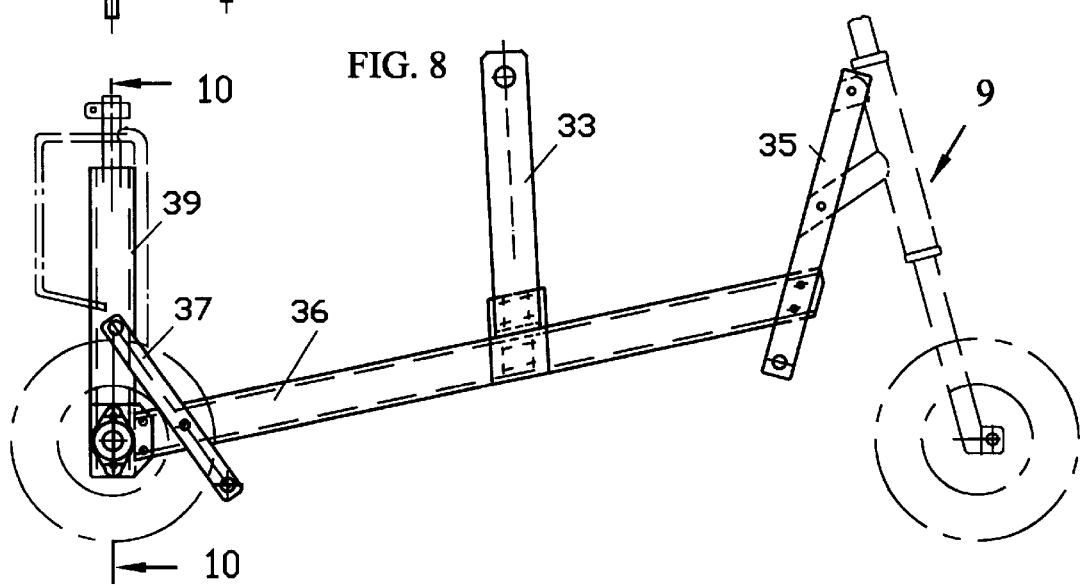
FIG. 8 is a side view of frame.

Refer to FIG. 8, side, and 8A, top view of frame, which is manufactured from rectangular tubing Tube 36 is installed inclined at a 12 degree angle to horizon, tubing 39 vertically mounted in lower rear end for seat installation, two flat gussets 37 are attached at a 30 degrees angle and clamped to vertical and horizontal tubes. Bar 38 is installed in bottom end of two gussets 37 to support swinging pedals at rear. On the front of frame, ⅓ from right side are attached two brackets 34 and two vertical rectangular extended supports 33. The right side of frame end with two flat bars 35 which are installed inclined for connection with front steering assembly and in the low pointjoint with supported swing levers axle 26.

Figure 9:
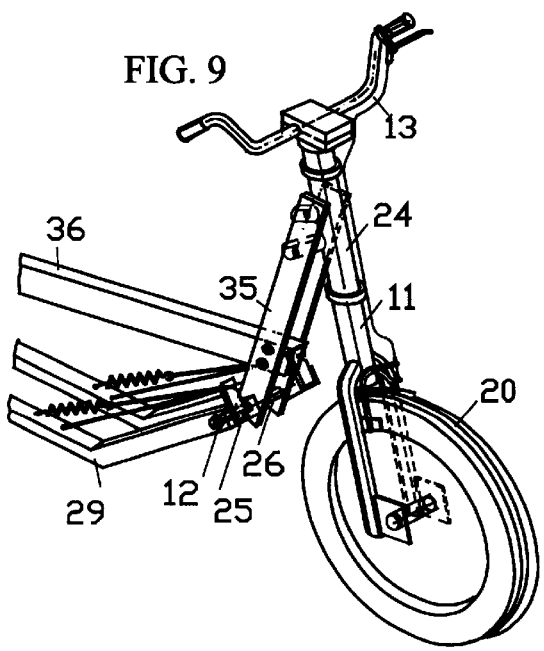
FIG. 9 is a view of front steering assembly.

Refer to FIG. 9 a view of the front steering assembly which includes front parts of frame and front side from conventional bicycle. Conventional bicycle frame top and down tubes are trimmed close to head tube and mounted to the upper end of frame, between two rectangular bars 35. Front bicycle unit includes front wheel 20, fork 11, handlebar 13, vertical head column pipe 24, and front brakes which are used from a conventional bicycle and are attached to the front side of frame by screws. At the front lower end through two rectangular bars is installed by press fit axle 26, which supports a pair of foot operated swing pedals 29. For reducing friction, in the front end of the each swing pedals are installed pressed sleeve bearings 12. Other ends of swing levers in rear portion of frame are supported by bar 38. Position of the handlebars 13 is adjusted depending on its operation.

Figure 10:
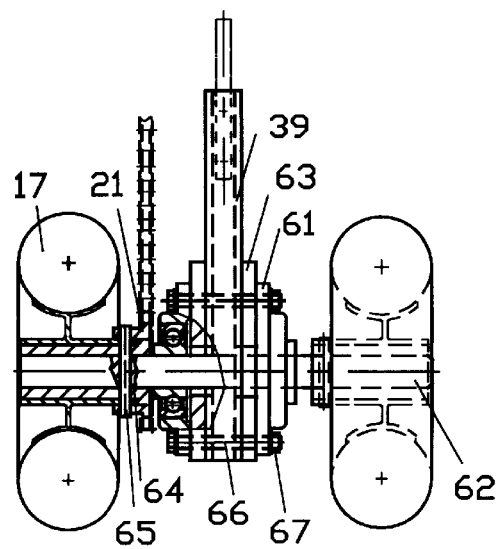
FIG. 10 is a view of drive rear assembly.

Refer to FIG. 10, cross-sectional view of rear drive wheel assembly, which shows two wheels 17 rigidly sleeved on the wheel hub 64, a wheel sprocket 21 rotatably sleeved on the wheel shaft 62. On both sides of two gussets 63 which connect tubing 36 and tubing 39 are attached two pillow ball bearing blocks 61 by screw 66 and nut 67 The wheel 17 and shaft 62 are locked through hubs by pins 65. The distance between center lines of two wheels is smallest permitted for vehicle to remain stable. Vertical rectangular tubing 39 supports the installation of seat post and saddle. The nest parts are from conventional frame tubing with seat-quick release clamp.

SUMMARY

It is the primary object of this invention to provide a human powered vehicle that will have the capability of being propelled either by arms or by legs.

According to the invention, the operator of the above described apparatus by operating the crank with either arms or legs or by stepping on the swing levers. A first transmission stage is stationary with respect to the apparatus; a second transmission stage when set in an upwardly extending position provides for arm exercise and when pivoted to a lower position provides for leg exercise.

According to this invention, the vehicle transmission has three basic set-ups:

First, for stepping or running exercise, a pair of foot operated swing levers, when forced down, via chain, rotate sprocket with overrun clutch and transfer torque to drive wheels. When springs return the levers up, overrun clutch is not activated. (In history of bicycle similar mechanism is called linear drive).

Second set-up is for regular leg cycling rotation, the second stage of the transmission terminated with a special crankshaft with three sprockets and turned to the lower position, both loops of chains and springs from third stage transmission are disconnected and hung up on the frame brackets, rotatable pedals attached to crankshaft.

Third set-up is for operation by arms, second stage of transmission is turned to upper position and fixed by links, each rotary pedal can be attached to crankshaft diametrically or parallel, for rowing workout the rotary pedals are mounted directly to the sprockets on the overrun clutch and can independently pivot back and forth. When operator uses arms for pedaling, the swinging levers only provide support for his legs. All of the above set up and operation actions may be performed with the vehicle's drive wheels placed on two rollers stand for stationary exercise.

For family application this vehicle can be easily converted to movable train with three or two sections set-up for different applications. In this case second and third sections are without front steering assembly.

I claim:

1. An exercise apparatus with a transmission which may be selectively adjusted to provide either arm exercises, leg pedaling exercises or stepping exercises, said apparatus comprising:

a frame;

a seat on said frame;

a pair of rear drive wheels rotatably mounted on a rear shaft at the rear of said frame;

a first transmission stage mounted on said frame coupled to transmit power to said rear drive wheels, said first transmission stage comprising:

a driven sprocket on said rear shaft;
a freewheel on a freewheel supporting shaft rotatably journaled on said frame spaced from said rear shaft;
a drive sprocket on said freewheel supporting shaft; and
an endless sprocket chain trained over said driven sprocket on said rear shaft and said drive sprocket on said freewheel supporting shaft;
a second transmission stage pivotally mounted on the freewheel supporting shaft of said first transmission stage, said second transmission stage comprising:
　a bracket formed of two spaced arms straddling said drive sprocket and freewheel on the freewheel supporting shaft and selectively pivotal with respect thereto;
　a crankshaft rotatably supported by said bracket at a spaced distance from the freewheel supporting shaft;
　a crankshaft sprocket affixed to said crankshaft for rotation therewith; and
　an endless crankshaft sprocket chain trained over said crankshaft sprocket and said drive sprocket on the freewheel supporting shaft;
a pair of crank arms on said crank shaft;
pedal-handles on the free ends of said crank arms;
a pair of swinging foot levers pivotally mounted on said frame;
a third transmission stage selectively coupleable to said second transmission stage, said third transmission stage comprising:
　a pair of springs, one for each of said foot levers connected to said foot levers; and
　a pair of sprocket chains one for each spring, one end of which is connected to one of said springs and the other end of which is connected to one of said foot levers, said chain trained over said crankshaft sprocket, whereby when said second transmission stage is extended upwardly from said freewheel supporting shaft, said rear wheel may be driven by manually rotating said crankshaft, and when said second transmission stage is turned to extend downwardly from said freewheel supporting shaft, said crankshaft may be pedaled, and when said foot levers are stepped on the force applied to said levers may be transmitted to the rear wheel.

2. An exercise apparatus as in claim 1 in which said foot levers are formed with a foot plate supporting portion connected to a forwardly extending leg at an angle to said supporting portion; a swing lever coupled between the end of the forwardly extending leg and said apparatus frame; and rear pivot leg coupled between the rear end of foot plate supporting portion and said frame.

3. An exercise apparatus as in claim 2 in which brackets are provided at the front of said foot levers for supporting said springs and sprocket chains of said third transmission stage may be anchored when said third transmission stage is not being employed.

4. An exercise apparatus as in claim 1 in which a supporting stand is provided for supporting said rear wheel, said stand having a pair of spaced rollers, at least on of which is irregular in circular cross-section to provide the effect of being on an irregular road.

5. An exercise apparatus as in claim 1 in which an overrun clutch is mounted on said crankshaft between said crank arms and said shaft to permit transmission of force in only one direction from said crank arms to said crank shaft.

* * * * *